United States Patent
Ueki

(10) Patent No.: US 8,063,938 B2
(45) Date of Patent: Nov. 22, 2011

(54) PHOTOGRAPHED IMAGE PROCESS CHANGEOVER APPARATUS OF A VIDEO TELEPHONE FUNCTION

(75) Inventor: Takashi Ueki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 635 days.

(21) Appl. No.: 12/163,479

(22) Filed: Jun. 27, 2008

(65) Prior Publication Data

US 2009/0002478 A1 Jan. 1, 2009

Related U.S. Application Data

(63) Continuation of application No. PCT/JP2005/024127, filed on Dec. 28, 2005.

(51) Int. Cl.
*H04N 5/228* (2006.01)
*H04N 7/14* (2006.01)
*H04N 5/262* (2006.01)
*H04N 5/225* (2006.01)

(52) U.S. Cl. ......... 348/208.16; 348/208.99; 348/208.12; 348/14.12; 348/14.01; 348/14.08; 348/240.2; 348/373; 348/375; 348/376

(58) Field of Classification Search ............... 348/208.99–208.16, 14.01–14.16, 348/240.2, 373–376
See application file for complete search history.

(56) References Cited

U.S. PATENT DOCUMENTS

| 6,297,846 | B1 | 10/2001 | Edanami | |
|---|---|---|---|---|
| 2001/0052928 | A1* | 12/2001 | Imagawa et al. | 348/14.12 |
| 2002/0015587 | A1* | 2/2002 | Ohishi et al. | 396/55 |

FOREIGN PATENT DOCUMENTS

| JP | 10-51755 | 2/1998 |
|---|---|---|
| JP | 10-150597 | 6/1998 |
| JP | 11-266391 | 9/1999 |
| JP | 2000-156849 | 6/2000 |
| JP | 2002-051316 | 2/2002 |
| JP | 2002-51316 | 2/2002 |
| JP | 2004-15367 | 1/2004 |
| JP | 2004015367 | * 1/2004 |

OTHER PUBLICATIONS

International Search Report mailed Apr. 11, 2006 in connection with the International Application No. PCT/JP2005/024127.
Korean Office Action mailed May 24, 2010, issued in corresponding Korean Patent Application 10-2008-7017160.
Japanese Office Action Oct. 20, 2009 in corresponding Japanese Patent Application 2007-552835.

* cited by examiner

*Primary Examiner* — Sinh Tran
*Assistant Examiner* — Christopher K Peterson
(74) *Attorney, Agent, or Firm* — Fujitsu Patent Center

(57) ABSTRACT

In order to provide a photographed image process changeover apparatus of a video telephone function which reduces the power consumption by providing only the most optimal functions in accordance with the state of a portable terminal, the comprisal at least includes an image cutout unit 11 for cutting out a predefined zone including a photography target from a photographed image taken by a camera comprised by the portable terminal, a handheld state detection unit 12 for detecting a handheld state, and a changeover unit 13 for changing over between the validity and invalidity of the image cutout unit 11 in accordance with the state of the portable terminal.

8 Claims, 4 Drawing Sheets

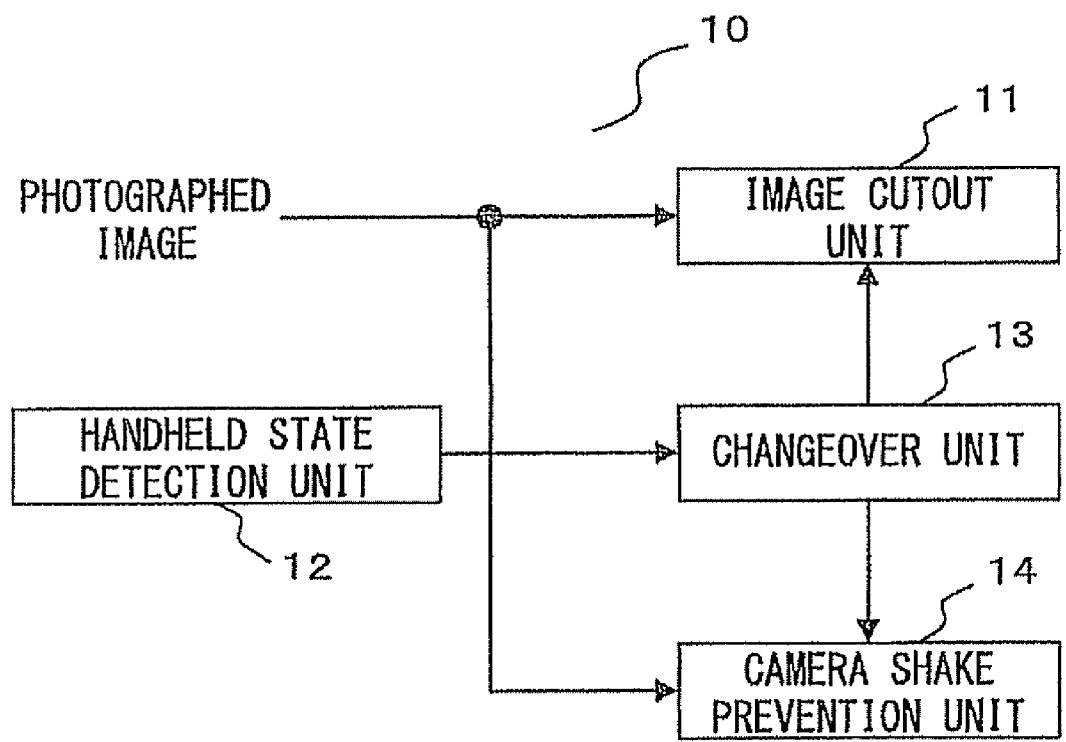
F I G. 1

PHOTOGRAPHED IMAGE PROCESS CHANGEOVER APPARATUS OF A VIDEO TELEPHONE FUNCTION

CROSS REFERENCE TO RELATED APPLICATION

This application is a continuation of PCT application of PCT/JP2005/024127, which was filed on Dec. 28, 2005.

BACKGROUND OF THE INVENTION

1. Field of the Invention

The present invention relates to a portable terminal equipped with a television (TV) telephone function and in particular to a photographed image process changeover apparatus controlling an image process for a photographed image that has been taken by a camera comprised by a portable terminal.

2. Description of the Related Art

Portable terminals such as portable telephones have been equipped with a number of functions in recent years. A representative function is a TV telephone (noted as "video telephone" or "video phone" hereinafter) function.

The video phone function (e.g., an optical system such as a camera) equipped in a portable terminal is designed on the premise that a user will hold the portable terminal in her/his hand(s) and use it in a manner such as near their face.

In such a case, a camera equipped with a standard- or wide-angle optical system, such as a system having a 40-degree angle of field or greater, is employed in order to photograph a face close to the camera in an appropriate size. Therefore, if a face, i.e., a photography target (also "photo target" hereinafter), is photographed by a camera placed at a distance, the ratio of the size of the face to the size of the person in the photograph is small in most cases.

Therefore, if the portable terminal is used in a user's hand (s), the face of the person in the image screen will be an appropriate size, while if the portable terminal is placed on a desk or such when talking on the phone, the ratio of the size of the face to the entire body of the person in the photo image screen becomes too small, hence making it difficult to discern facial expression.

Meanwhile, the video phone function of a portable terminal allows image processes such as cancelling the blurring of an image screen due to camera shaking and transmitting, to a correspondent terminal, a cut out and enlarged face part within an image screen, which is recognized by utilizing the techniques of recognizing a person's position or facial position. Performing image processing generally requires a high processing capacity, needing large power consumption.

Reference patent document 1 has disclosed an image display control apparatus used for a video conference terminal for appropriately displaying a person's image by detecting the person securely and creating an easily viewable image display even when the person moves.

Reference patent document 2 has disclosed an image pickup apparatus aiming at a high-quality camera shake correction function while securing a sufficient cutout positional accuracy.

Reference patent document 3 has disclosed a portable information terminal apparatus equipped with the function of preventing video image blurring when camera shaking occurs and that of changing over a display to the photographed video image of a photo target in order to have a user recognize inappropriateness of the photography angle.

Patent document 1: Laid-Open Japanese Patent Application Publication No. H10-051755
Patent document 2: Laid-Open Japanese Patent Application Publication No. H11-266391
Patent document 3: Laid-Open Japanese Patent Application Publication No. 2000-156849

SUMMARY OF THE INVENTION

In consideration of the above described problem, the problem to be solved by the present invention is to provide a photographed image process changeover apparatus used for a video phone function to reduce the power consumption by providing the most optimal function in accordance with the state of a portable terminal.

In order to solve the above described problem, a photographed image process changeover apparatus according to the present invention is the apparatus of a video phone function equipped in a portable terminal, comprising: an image cutout unit for performing an image cutout process which recognizes a photography target in a photographed image obtained by a camera comprised by the portable terminal, cuts out a prescribed zone including the recognized photography target and transmits the cutout zone to a correspondent party communicating by means of the video phone function; a handheld state detection unit for detecting that the portable terminal is held in hand at the time of a communication by means of the video phone function; and a changeover unit for stopping an image cutout process to be performed by the image cutout unit if the portable terminal is held in hand and carrying out the image cutout process to be performed by the image cutout unit if the portable terminal is not held in hand.

According to the present invention, the changeover unit stops an image cutout process to be performed by the image cutout unit when a portable terminal detected by the handheld state detection unit is held in hand and carries out an image cutout process to be performed by the image cutout unit if the portable terminal is not held in hand. This configuration enables an image cutout process only when an image cutout process is required for the portable terminal. Note that a photography target recognized by the image cutout unit is, for example, a person's face.

That is, the configuration enables the provision of only the most optimal function in accordance with the state of a portable terminal. It is also possible to reduce the power consumption because an unnecessary function(s) is stopped in accordance with the state of the portable terminal.

As noted above, the present invention is contrived to provide only the most optimal functions in accordance with the state of a portable terminal, thereby enabling the provision of reduced power consumption in a photographed image process changeover apparatus used for a video phone function.

BRIEF DESCRIPTION OF THE DRAWINGS

FIG. 1 is a diagram showing the principle of the present invention;

DESCRIPTION OF THE PREFERRED EMBODIMENTS

Figure 2:
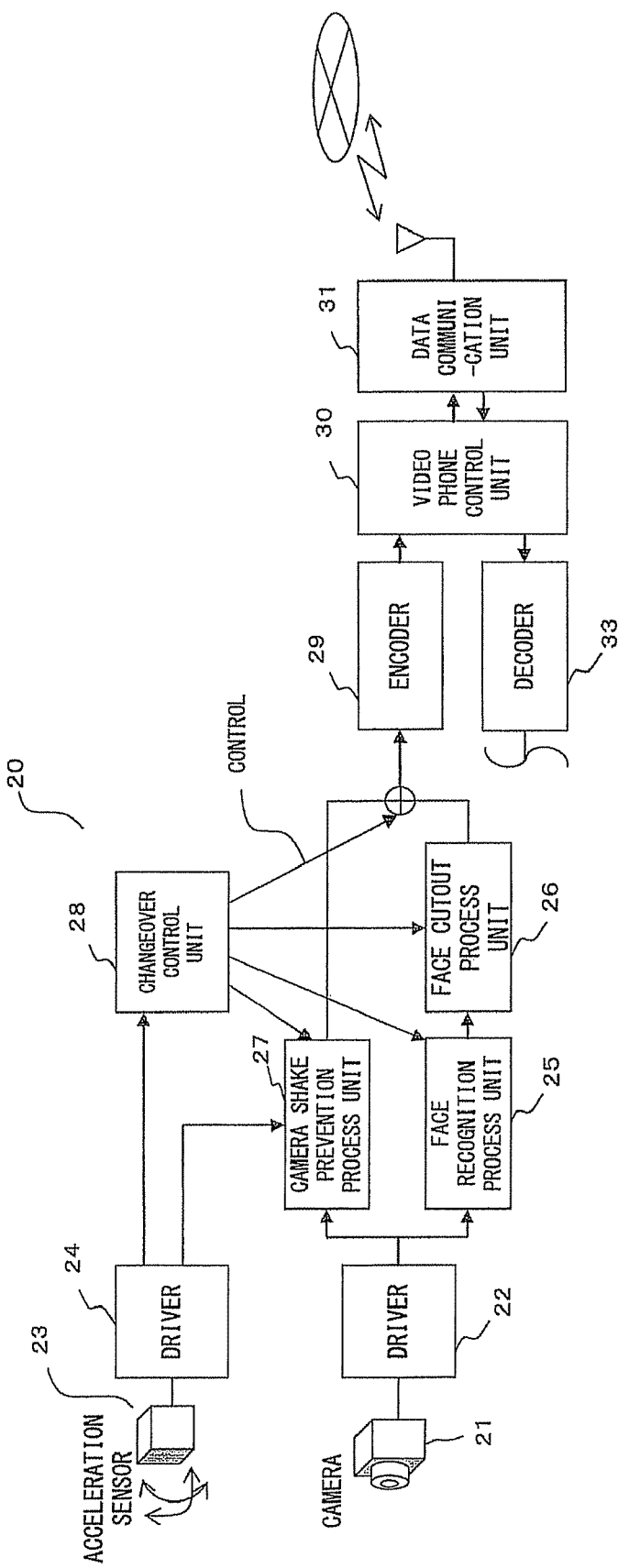
FIG. 2 is a diagram showing the configuration of the major parts of a portable terminal implementing a photographed image process changeover apparatus according to a preferred embodiment of the present invention.

The following is a description in detail of the preferred embodiment of the present invention by referring to FIGS. 1 through 4.

FIG. 1 is a diagram showing the principle of the present invention.

The photographed image process changeover apparatus 10 shown in FIG. 1 at least comprises an image cutout unit 11 for cutting out a predefined zone including a person's face from a photographed image obtained by photographing with a camera comprised by a portable terminal equipped with a video phone (simply noted as "portable terminal" hereinafter) and transmitting the cutout zone to a correspondent party, a handheld state detection unit 12 for detecting a state in which a user holds a portable terminal in her/his hand (noted as "handheld state" hereinafter), and a changeover unit 13 for changing over between the validity and invalidity of the image cutout unit 11 in accordance with the state of the portable terminal detected by the handheld state detection unit 12.

The changeover unit 13 stops an image cutout process of an image cutout unit 11 if the handheld state detection unit 12 detects that a portable terminal is held in hand. In contrast, the changeover unit 13 makes the image cutout unit 11 carry out an image cutout process if the handheld state detection unit 12 detects that a portable terminal is not held in hand.

The photographed image process changeover apparatus 10 shown in FIG. 1 also shows the case of further comprising a camera shake prevention unit 14 for detecting camera shake in the portable terminal and correcting the photographed image.

Further, the changeover unit 13 makes the camera shake prevention unit 14 carry out a camera shake correction process for a photographed image if the handheld state detection unit 12 detects that the portable terminal is in a handheld state. In contrast, the changeover unit 13 makes the camera shake prevention unit 14 stop a camera shake correction process for a photographed image if the handheld state detection unit 12 detects that the portable terminal is not in a handheld state.

FIG. 2 shows the configuration of the major parts of a portable terminal 20 implementing a photographed image process changeover apparatus 10 according to a preferred embodiment of the present invention.

The portable terminal 20 shown in FIG. 2 at least comprises a camera (or an imaging element such as a charge coupled device (CCD)) 21 for photographing an object, a driver 22 for driving the camera 21, an acceleration sensor 23 for detecting camera shake in the portable terminal 20, a driver 24 for driving the acceleration sensor 23, a face recognition process unit 25 for recognizing the face of a person from a photographed image generated by the camera 21, a face cutout process unit 26 for cutting out a predefined zone including the person's face recognized by the face recognition process unit 25, a camera shake prevention process unit 27 for correcting the camera shake of the photographed image on the basis of an amount of camera shake, a changeover control unit 28 for changing over the image processes (between a face cutout process and a camera shake prevention process) applied to the photographed image in accordance with the state of the portable terminal 20, an encoder 29 for encoding the photographed image after applying the face cutout process or camera shake correction process into a prescribed protocol, a video phone control unit 30 for making a decoder decode the data of an encoded photographed image (noted as "display image" hereinafter), displaying the display image in the portable terminal 20 and also transmitting the display image and voice data to a correspondent party by way of a data communication unit 31 and a data communication unit 31 for transmitting the display image and voice data to the correspondent party.

Note that it is clear that the portable terminal 20 comprises a central processing unit (CPU) and nonvolatile/volatile memory (e.g., random access memory (RAM) and electronically erasable and programmable read only memory (EEPROM)), although they are not shown in a drawing herein.

Further, the CPU executing the instructions of a program stored in the memory implements the constituent components shown in FIG. 2, i.e., the drivers 22 and 24, face recognition process unit 25, face cutout process unit 26, camera shake prevention process unit 27, changeover control unit 28, encoder 29, video phone control unit 30, and the like.

The photographed image generated by the camera 21 is input into the face recognition process unit 25 and camera shake prevention process unit 27. When the photographed image is input into the face recognition process unit 25, it recognizes the face of a person from the image recorded in the photographed image. Then, the face cutout process unit 26 extracts a predefined zone (e.g., a zone encompassing a bust shot) including the face of the recognized person from the photographed image.

Therefore, even if the ratio of the person's face to the entirety of the photographed image is small, the face recognition process unit 25 and face cutout process unit 26 convert the photographed image into, for example, a bust shot and thereby the expression of the person can clearly be recognized.

Meanwhile, when the photographed image is input into the camera shake prevention process unit 27, it calculates an amount of camera shake from the sensor value of an acceleration sensor 23 to correct the photographed image. Therefore, blurring of an object image caused by camera shake in the portable terminal is removed from the corrected photographed image.

The changeover control unit 28 detects (and discerns) the state of the portable terminal (i.e., being held in hand or not held in hand) from an acceleration obtained by the acceleration sensor 23 in this event. The changeover control unit 28 then controls the exclusive changeover, in accordance with the state of the portable terminal, between a camera shake prevention process to be carried out by the camera shake prevention process unit 27 and an image cutout process to be carried out by the face recognition process unit 25 and face cutout process unit 26.

That is, if the portable terminal is not held in hand, the changeover control unit 28 stops a camera shake prevention process from being performed by the camera shake prevention process unit 27 and starts an image cutout process to be performed by the face recognition process unit 25 and face cutout process unit 26, followed by outputting, to the encoder 29, the photographed image to which the image cutout process has been applied.

In contrast, if the portable terminal 20 is held in hand, it stops an image cutout process from being performed by the face recognition process unit 25 and face cutout process unit 26, and starts a camera shake prevention process to be performed by the face cutout process unit 26, followed by outputting, to the encoder 29, the photographed image to which the camera shake prevention process has been applied.

The encoder 29 then converts the input photographed image into data which is compliant to MPEG-4 (Moving Picture Experts Group phase 4), ITU-T (International Telecommunication Union Telecommunication Standardization Sector), or the like, as appropriate.

The video phone control unit 30 transmits the encoded data to a correspondent party by way of the data communication unit 31. It also outputs the data to a decoder 33 and displays the photographed image in a display unit (not shown in a drawing herein) of the portable terminal as appropriate.

In the above described configuration, the image cutout unit 11 is implemented by the face recognition process unit 25 and face cutout process unit 26, while the handheld state detection unit 12 and changeover unit 13 are implemented by the acceleration sensor 23, driver 24 and changeover control unit 28. Further, the camera shake prevention unit 14 is implemented by the acceleration sensor 23, driver 24 and camera shake prevention process unit 27.

Figure 3:
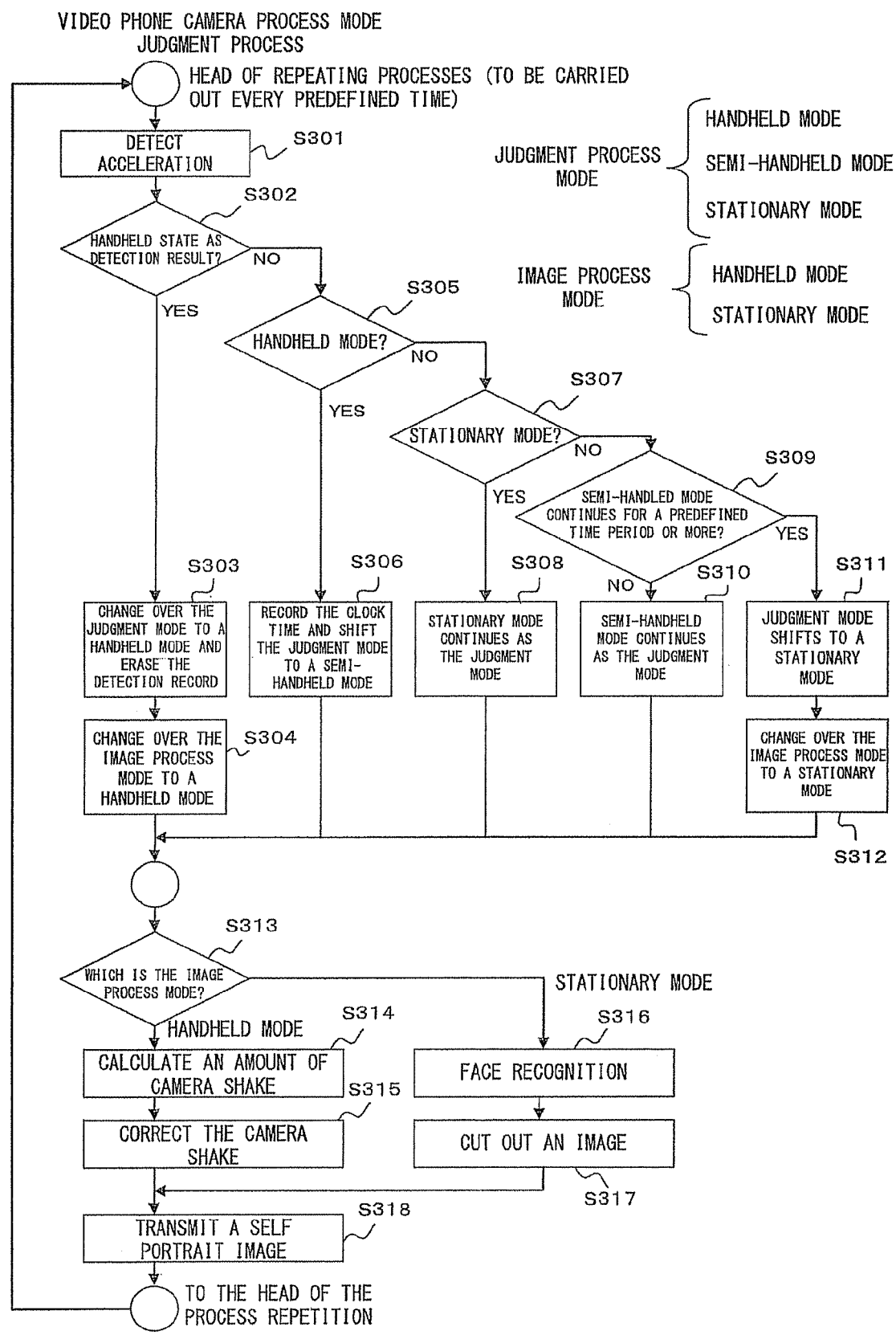
FIG. 3 is a flow chart showing the process of a portable terminal according to a preferred embodiment of the present invention.

Next, is a description, in detail, of the process of the portable terminal 20 described above, by referring to FIGS. 3 and 4. FIG. 3 is a flow-chart showing the process of the portable terminal 20 according to a preferred embodiment of the present invention.

In step S301 (also noted simply as "S301" hereinafter), the changeover control unit 28 discerns the state of the portable terminal 20 (i.e., whether it is in a handheld state or not) from the acceleration value of the acceleration sensor 23. As an example, a predefined acceleration value is pre-set as a threshold value and, if the acceleration value detected by the acceleration sensor 23 is no more than the threshold value, the portable terminal 20 is judged to be being held in hand, while if the acceleration value is no less than the threshold value, the portable terminal 20 is judged to be not being held in hand. The changeover control unit 28 shifts the process to S302.

In S302, if the detection result of S301 is that it is in the handheld state, the changeover control unit 28 shifts the process to S303, while it shifts the process to S305 if the detection result of S301 is that it is not in a handheld state.

Note that the changeover control unit 28 according to the present embodiment is configured to have a judgment process mode, which is used for judging the state of the portable terminal 20, and an image process mode, which is used for selecting an image process for a photographed image.

The judgment process mode consists of three modes, i.e., a handheld mode indicating the portable terminal 20 being held in hand, a semi-handheld mode indicating the portable terminal 20 being held in hand with a slight shake detected and a stationary mode indicating the portable terminal 20 being stationary.

Further, the image process mode consists of two modes, a handheld mode indicating that the portable terminal 20 is judged to be in a handheld state and a stationary mode indicating that the portable terminal 20 is judged to not be in a handheld state (i.e., is in a stationary state), both from each mode of the judgment process mode.

Both the judgment process mode and image process mode are stored in memory or the like comprised by the portable terminal 20 to which the CPU refers or writes a mode as appropriate.

In S303, the changeover control unit 28 changes over the judgment mode to a handheld mode and shifts the process to S304. In S304, the changeover control unit 28 changes over the image process mode to a handheld mode.

Meanwhile, if the present judgment process mode is a handheld mode in S305, the changeover control unit 28 shifts the process to S306, records the clock time and shifts the judgment process mode to a semi-handheld mode.

In contrast, if the present judgment process mode is not a handheld mode in S305, the changeover control unit 28 shifts the process to S307. Meanwhile, if the present judgment process mode is a stationary mode, the changeover control unit 28 shifts the process to S308 and continues the present judgment process mode (i.e., it does not change modes).

In S309, the changeover control unit 28 checks whether or not the semi-handheld mode has continued for a predefined time period and, if the state of the semi-handheld mode has not changed in the predefined time period, shifts the process to S310 to continue the present judgment mode (i.e., it does not change modes).

Meanwhile, if the state of the semi-handheld mode has not changed in the predefined time period, the changeover control unit 28 shifts the process to S311 and changes the judgment mode to a stationary mode. Then in S312, the changeover control unit 28 changes over the image mode to a stationary mode.

When the image process mode is determined by the processes of the above steps S301 through S312, the changeover control unit 28 shifts the process to S313, followed by checking the image process mode that has been determined in steps S301 through S312. Then, the processes are carried out in accordance with the image process mode.

In S313, the changeover control unit 28 checks the image process mode and, if the image process mode is a handheld mode, shifts the process to S314, while if the image process mode is a stationary mode, shifts the process to S316.

In S314, the camera shake prevention process unit 27 obtains a sensor value (i.e., an acceleration value) from the acceleration sensor 23 and calculates an amount of camera shake from the sensor value. Note that the present embodiment is configured to calculate the amount of camera shake as, from the sensor value, the movement distances of an imaging element (e.g., the CCD equipped in the camera 21) in the vertical and horizontal directions, respectively, and to use a value converted from the movement distances into the numbers of pixels, respectively.

Upon completing the calculation of the camera shake amount, the camera shake prevention process unit 27 shifts the process to S315.

In S315, the camera shake prevention process unit 27 corrects the photographed image on the basis of the camera shake amount calculated in S314. The present embodiment is configured to cut out a predetermined zone having a position, as the center of the zone, shifted in the horizontal and vertical directions, for example from the center of the photographed image, by an amount equivalent to the camera shake amount and to generate a photographed image (i.e., a camera shake-corrected photographed image) anew. Note that the newly photographed image may be enlarged or reduced in size as appropriate.

In the meantime, the face recognition process unit 25 recognizes the face of a person photographed in the photographed image and calculates the position and size of the face in S316. The face recognition process according to the present embodiment may be configured, for example, to identify the positions of a person's eyes (i.e., the position of the face) by extracting a part with a high brightness and then to identify the face size from the distance between the eyes, or to apply the process of a contour emphasis to the photographed image and then to identify the person's face by comparing the aforementioned processed image with a pre-prepared plurality of facial forms (i.e., contours), respectively.

Upon finishing the face recognition process, the face recognition process unit 25 shifts the process to S317.

In S317, the face cutout process unit 26 calculates an image zone that constitutes a bust shot from the position of the face identified in S316, cuts out the image of the calculated zone, and generates a photographed image (i.e., a photographed image that is a result of cutting out the person's face) anew. Note that the newly photographed image may be enlarged or reduced in size as appropriate.

The photographed image, to which the above described camera shake correction process or image cutout process is applied, is transmitted to the video phone control unit 30 by way of the encoder 29. Then, the process is shifted to S318.

In S318, the video phone control unit 30 transmits, to the correspondent party by way of the data communication unit 31, the photographed image, to which the camera shake correction process in steps 314 and 315 or the image cutout process in steps S316 and S317 is applied, as a self portrait image data.

Figure 4:
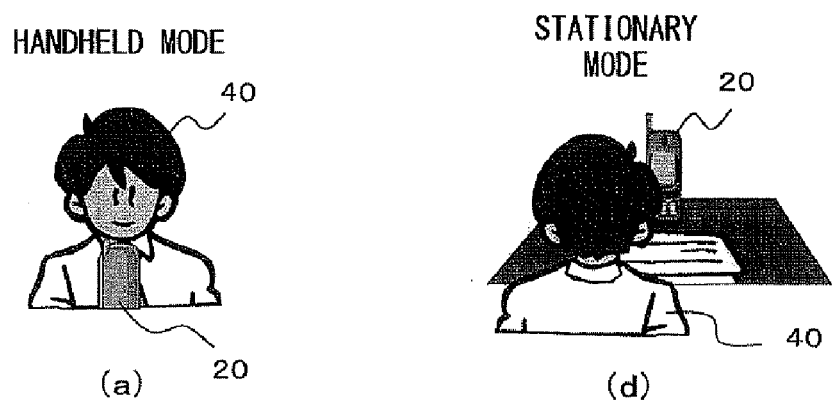
FIG. 4 is a diagram describing the state of a portable terminal and a photographed image in each state according to a preferred embodiment of the present invention.
Figure 4:
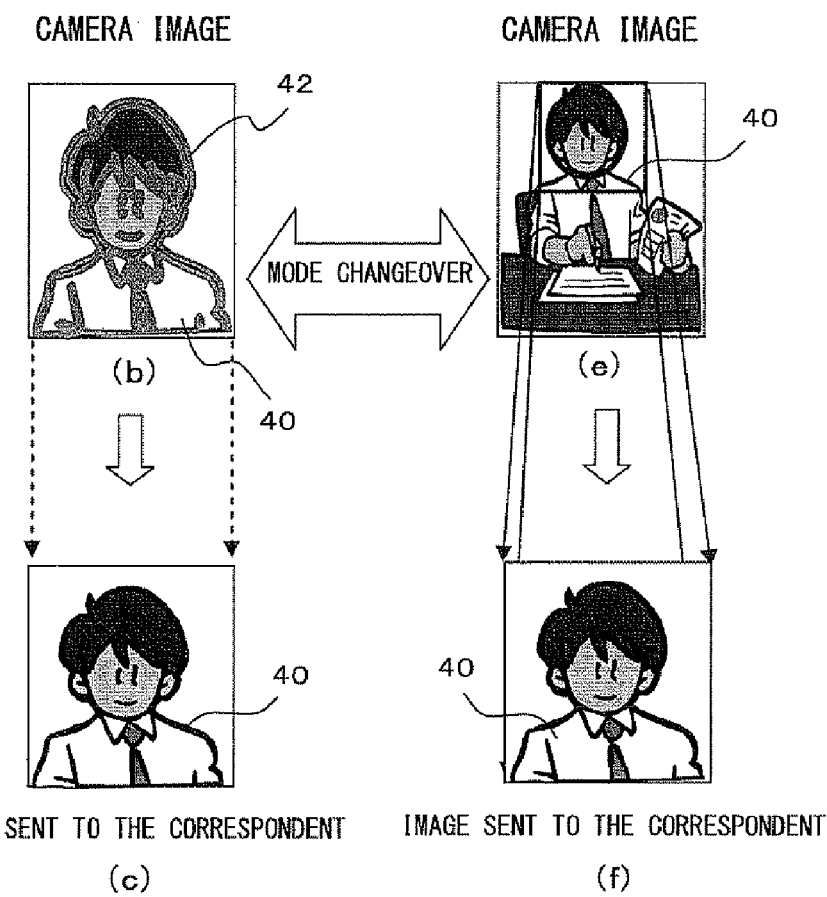

FIG. 4 is a diagram describing the state of the portable terminal 20 and a photographed image in each state according to a preferred embodiment of the present invention.

FIG. 4 shows (a) the situation in a handheld mode, (b) the photographed image in a handheld mode and (c) the photographed image after applying a camera shake correction process; and further shows (d) the situation at a stationary mode, (e) the photographed image in a stationary mode and (f) the photographed image after applying an image cutout process.

Situation (a) in a handheld mode shows the case of the image process mode shown in FIG. 3 being a handheld mode. That is, this shows a situation in which a user 40 (or an object 40; noted as "user 40" or "object 40" as appropriate hereinafter) is engaged in communication by means of the video phone function while holding the portable terminal 20 in her/his hand so as to keep the distance constant between the portable terminal 20 and her/his face.

Photographed image (b) exemplifies the case of the photographed image (i.e., the photographed image before applying a camera shake correction process) photographed with the image process mode in a handheld mode. The photographed image (b) is taken with the portable terminal being in the state of being held in hand by the user (i.e., handheld state) and therefore a camera shake 42 (i.e., the bold lines indicated in the contour parts of the object 40) occurs in the photographed image.

A camera shake correction process is applied to the photographed image (b) by the camera shake prevention process unit 27 to obtain a photographed image (c). The photographed image (c) is a post-camera-shake corrected photographed image, and is then transmitted to the correspondent party by way of the encoder 29, video phone control unit 30 and data communication unit 31. The photographed image (c) is the result of removing the camera shake 42 that occurred in the contour parts of the object 40.

The situation in the stationary mode (d) shows a situation in which the image process mode shown in FIG. 3 is a stationary mode. That is, this shows the situation in which the portable terminal 20 is fixed on a desktop or the like so as to keep the distance constant between the portable terminal 20 and the person's face and a communication by means of a video phone function is carried out. In this event, the distance between the portable terminal 20 and object 40 is longer than that in the case in which the image process mode is a handheld mode.

Photographed image (e) exemplifies the photographed image (i.e., a photographed image before an image cutout process is applied thereto) photographed while the image process mode is in a stationary mode. In photographed image (e), the distance between the portable terminal 20 and object 40 is longer than that in the case when the image process mode is in a handheld mode (i.e., a handheld state) and the ratio of the face of the object 40 to the entirety of the photographed image is accordingly smaller.

An image cutout process is applied by the face recognition process unit 25 and face cutout process unit 26 to photographed image (e) to obtain photographed image (f) Photographed image (f) is a photographed image after an image cutout process is applied thereto and shows the photographed image transmitted to the correspondent party by way of the encoder 29, video phone control unit 30, and data communication unit 31. Photographed image (f) becomes the bust shot of the object 40 taken in photographed image (e).

As described above, the photographed image process changeover apparatus 10 according to the present embodiment is configured such that the changeover control unit 28 detects the state of the portable terminal 20 from the sensor value of the acceleration sensor 23.

Then, if the portable terminal 20 is in a handheld state, the changeover control unit 28 starts a camera shake correction process to be performed by the camera shake prevention process unit 27 for the photographed image taken by the camera 21 and also stops an image cutout process from being performed by the face recognition process unit 25 and face cutout process unit 26.

Meanwhile, if the portable terminal 20 is not in a handheld state, the changeover control unit 28 starts an image cutout process for application to the photographed image taken by the camera 21, the process being performed by the face recognition process unit 25 and face cutout process unit 26, and also stops the camera shake correction process from being performed by the camera shake prevention process unit 27.

As such, the changeover control unit 28 controls so as to execute only necessary functions in accordance with the state of the portable terminal, thereby bringing forth the effect of enabling the reduction of power consumption.

Further, the configuration eliminates the need to simultaneously carry out the processes, such as the camera shake correction process and image cutout process, levying a high load on the portable terminal 20, thereby making it possible to provide the most optimal video phone function in accordance with the condition of the portable terminal 20 even with the use of a CPU having a lower processing capacity than before. Further, the use of a CPU having a lower processing capacity enables the provision of the most optimal video phone function in accordance with the condition of the portable terminal at a lower cost.

Further, the allocation of surplus process capacity produced by carrying out only the image processes necessary for each state of the portable terminal 20 also makes it possible to improve the image quality of the photographed image taken in a handheld state.

Note that the portable terminal 20 according to the present embodiment has been described by exemplifying the portable phone equipped with a video phone function; it is to be clearly understood that a similar benefit is obtained for other portable terminals each equipped with a video phone function.

The present embodiment described above is configured to use the acceleration sensor 23 as the handheld state detection unit 12; it is not intended to limit it thereto. The handheld state of the portable terminal 20 may be detected by using, for example, a capacitance sensor, a continuity sensor, or the like.

What is claimed is:

1. A photographed image process changeover apparatus of a video telephone function equipped in a portable terminal, the photographed image process changeover apparatus comprising:

an image cutout unit configured to perform an image cutout process which recognizes a photography target in a photographed image obtained by a camera comprised by the portable terminal, cuts out a prescribed zone including the recognized photography target, and transmits the cutout zone to a correspondent party communicating by means of the video telephone function;

a handheld state detection unit configured to detect that the portable terminal is held in hand at the time of a communication by means of the video telephone function; and a changeover unit configured to stop an image cutout process to be performed by the image cutout unit if the portable terminal is held in hand and to carry out the image cutout process to be performed by the image cutout unit if the portable terminal is not held in hand, wherein said changeover unit comprises a judgment mode consisting of three modes, that is, a handheld mode, a semi-handheld mode and a stationary mode, wherein a mode is shifted to the handheld mode and an image cutout process to be performed by said image cutout unit is stopped if said portable terminal is detected as being held in hand during the stationary mode, a mode is shifted to the semi-handheld mode if the portable terminal is detected as not being held in hand during the handheld mode, and a mode is shifted to the stationary mode and an image cutout process to be performed by the image cutout unit is carried out if the portable terminal is detected as not being held in hand for only a predefined time period during the semi-handheld mode.

2. The photographed image process changeover apparatus of a video telephone function according to claim 1, the photographed image process changeover apparatus further comprising a camera shake prevention unit configured to detect an amount of camera shake caused by the camera shake of said portable terminal and to correct the camera shake of said photographed image in accordance with the camera shake amount, wherein said changeover unit carries out the correction of the camera shake to be performed by the camera shake prevention unit if the portable terminal is held in hand and stops the correction of the camera shake from being performed by the camera shake prevention unit if the portable terminal is not held in hand.

3. The photographed image process changeover apparatus of a video telephone function according to claim 1, the photographed image process changeover apparatus further comprising a camera shake prevention unit configured to detect an amount of camera shake caused by the camera shake of said portable terminal and to correct the camera shake of said photographed image in accordance with the camera shake amount, wherein a camera shake correction to be performed by said camera shake prevention unit is carried out if said portable terminal is detected as being held in hand during the stationary mode, and a camera shake correction to be performed by the camera shake prevention unit is stopped if the portable terminal is detected as not being held in hand for only a predefined time period during the semi-handheld mode.

4. The photographed image process changeover apparatus of a video telephone function according to claim 1, wherein said handheld detection unit employs any one of an acceleration sensor, a capacity sensor, and a continuity sensor.

5. A photographed image process changeover method used for a video telephone function equipped in a portable terminal, the photographed image process changeover method comprising:

detecting that the portable terminal is in a state of being held in hand at the time of a communication by means of the video telephone function;

stopping an image cutout process which recognizes a photography target in a photographed image obtained by a camera comprised by the portable terminal, cutting out a predefined zone including the recognized photography target, and transmitting the cutout zone to a correspondent party communicating by means of the video telephone function if the portable terminal is held in hand;

carrying out the image cutout process if the portable terminal is not being held in hand; and a judgment mode consisting of three modes, that is, a handheld mode, a semi-handheld mode and a stationary mode, wherein a mode is shifted to the handheld mode and an image cutout process to be performed by said image cutout process is stopped if said portable terminal is detected as being held in hand during the stationary mode, a mode is shifted to the semi-handheld mode if the portable terminal is detected as not being held in hand during the handheld mode, and a mode is shifted to the stationary mode and an image cutout process to be performed by the image cutout process is carried out if the portable terminal is detected as not being held in hand for only a predefined time period during the semi-handheld mode.

6. The photographed image process changeover method used for a video telephone function according to claim 5, the photographed image process changeover method comprising carrying out a camera shake prevention process which detects an amount of camera shake caused by the camera shake of said portable terminal and corrects the camera shake of said photographed image in accordance with the camera shake amount if the portable terminal is held in hand, and stopping a camera shake correction from being performed by the camera shake prevention process if the portable terminal is not held in hand.

7. The photographed image process changeover method used for a video telephone function according to claim 5, wherein a camera shake prevention process is carried out in which an amount of camera shake caused by the camera shake of the portable terminal is detected and a camera shake correction of the photographed image is carried out in accordance with the camera shake amount if said portable terminal is detected as being held in hand during the stationary mode, and a camera shake correction by means of the camera shake prevention process is stopped if the portable terminal is detected as not being held in hand for only a predefined time period during the semi-handheld mode.

8. A portable terminal equipped with a video telephone function, the portable terminal comprising:

a camera for photographing an image necessary for the video telephone function;

an image cutout unit configured to perform an image cutout process which recognizes a photography target in a photographed image obtained by the camera, cuts out a prescribed zone including the recognized photography target, and transmits the cutout zone to a correspondent party communicating by means of the video telephone function;

a handheld state detection unit configured to detect that the portable terminal is held in hand at the time of a communication by means of the video telephone function; and a changeover unit configured to stop an image cutout process from being performed by the image cutout unit if the portable terminal is held in hand and to carry out the image cutout process to be performed by the image cutout unit if the portable terminal is not held in hand, wherein said changeover unit comprises a judgment mode consisting of three modes, that is, a handheld mode, a semi-handheld mode and a stationary mode, wherein a mode is shifted to the handheld mode and an image cutout process to be performed by said image cutout unit is stopped if said portable terminal is detected as being held in hand during the stationary mode, a mode is shifted to the semi-handheld mode if the portable terminal is detected as not being held in hand during the handheld mode, and a mode is shifted to the stationary mode and an image cutout process to be performed by the image cutout unit is carried out if the portable terminal is detected as not being held in hand for only a predefined time period during the semi-handheld mode.

* * * * *